(12) United States Patent
Kobayashi

(10) Patent No.: US 10,140,538 B2
(45) Date of Patent: Nov. 27, 2018

(54) COMPUTING CONTROL DEVICE, COMPUTING CONTROL METHOD, AND COMPUTER READABLE MEDIUM

(71) Applicant: Renesas Electronics Corporation, Tokyo (JP)

(72) Inventor: Yuki Kobayashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 443 days.

(21) Appl. No.: 15/063,222

(22) Filed: Mar. 7, 2016

(65) Prior Publication Data

US 2016/0283810 A1    Sep. 29, 2016

(30) Foreign Application Priority Data

Mar. 26, 2015    (JP) ................................ 2015-063957

(51) Int. Cl.
*G06K 9/00*    (2006.01)
*G06K 9/46*    (2006.01)

(52) U.S. Cl.
CPC ....... *G06K 9/00973* (2013.01); *G06K 9/4642* (2013.01)

(58) Field of Classification Search
None
See application file for complete search history.

(56) References Cited

U.S. PATENT DOCUMENTS 9,569,221 B1 * 2/2017 Chaudhri .............. G06F 9/3851
2016/0210721 A1 * 7/2016 Taylor ....................... G06T 1/20

OTHER PUBLICATIONS

Khronos Group, "OpenVX", [online], [searched on Mar. 26, 2015], Internet <see URL: https://www.khronos.org/openvx/>.

* cited by examiner

*Primary Examiner* — Craig C Dorais
(74) *Attorney, Agent, or Firm* — McGinn I.P. Law Group, PLLC

(57) ABSTRACT

A computing control device includes extracting a node having a plurality of processing functions having accuracies different from one another from a graph; calculating a required accuracy of a node subsequent to the node that has been extracted; selecting a processing function having a minimum accuracy equal to or higher than the required accuracy that has been calculated from among the plurality of processing functions included in the node that has been extracted; and setting the processing function that has been selected as the processing function of the node that has been extracted.

8 Claims, 13 Drawing Sheets

Fig. 3

ESTIMATED GRAPH

```
        sobelx          phase
in ○──→(vxSobel3x3)──→(vxPhase)──→(vxHistogram)──→○ out
                  sobely
```

| NODE ID | 2 |
|---|---|
| EXECUTION STATE | UNEXECUTED |
| KERNEL NAME | vxPhase |
| PROCESSING FUNCTION | vxPhaseKernel() |
| INPUT CONNECTION INFORMATION | |
| ARGUMENT 1 | Node(1):2 |
| ARGUMENT 2 | Node(1):3 |
| OUTPUT CONNECTION INFORMATION | |
| ARGUMENT 3 | Node(3):1 |

| NODE ID | 3 |
|---|---|
| EXECUTION STATE | UNEXECUTED |
| KERNEL NAME | vxHistogram |
| PROCESSING FUNCTION | vxHistogramKernel() |
| INPUT CONNECTION INFORMATION | |
| ARGUMENT 1 | Node(2):3 |
| OUTPUT CONNECTION INFORMATION | |
| ARGUMENT 2 | Node(out):1 |

GRAPH INFORMATION

| NODE ID | 1 |
|---|---|
| EXECUTION STATE | UNEXECUTED |
| KERNEL NAME | vxSobel3x3 |
| PROCESSING FUNCTION | vxSobel3x3Kernel() |
| INPUT CONNECTION INFORMATION | |
| ARGUMENT 1 | Node(in):1 |
| OUTPUT CONNECTION INFORMATION | |
| ARGUMENT 2 | Node(2):1 |
| ARGUMENT 3 | Node(2):2 |

KERNEL INFORMATION

| KERNEL NAME | vxSobel3x3 |
|---|---|
| PROCESSING FUNCTION | vxSobel3x3Kernel() |

| KERNEL NAME | vxHistogram |
|---|---|
| PROCESSING FUNCTION | vxHistogramKernel() |

| KERNEL NAME | vxPhase | |
|---|---|---|
| PROCESSING FUNCTION | vxPhaseKernel() |
| | vxPhaseKernelFast() |

Fig. 4

PROCESSING FUNCTION INFORMATION

| NAME OF PROCESSING FUNCTION | vxSobel3x3Kernel () | |
|---|---|---|
| ARGUMENT NAME | DIRECTION | ACCURACY |
| in | in | 8bit |
| outx | out | 9bit |
| outy | out | 9bit |

| NAME OF PROCESSING FUNCTION | vxPhaseKernel () | |
|---|---|---|
| ARGUMENT NAME | DIRECTION | ACCURACY |
| inx | in | 9bit |
| iny | in | 9bit |
| out | out | 8bit |

| NAME OF PROCESSING FUNCTION | vxHistogramKernel () | |
|---|---|---|
| ARGUMENT NAME | DIRECTION | ACCURACY |
| dir | in | 3bit |
| out | out | 8bit |

| NAME OF PROCESSING FUNCTION | vxPhaseKernelFast () | |
|---|---|---|
| ARGUMENT NAME | DIRECTION | ACCURACY |
| inx | in | 9bit |
| iny | in | 9bit |
| out | out | 3bit |

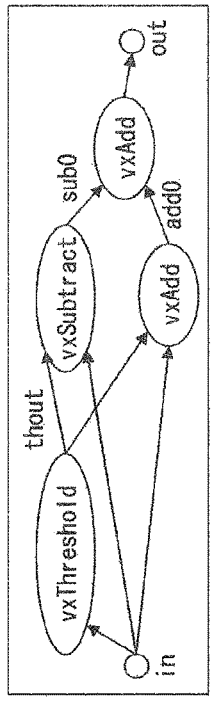

```
void func() {
  vx_context context = vxCreateContext();
  vx_image in  = vxCreateImage(context, width, height, VX_DF_IMAGE_U8 );
  vx_image out = vxCreateImage(context, width, height, VX_DF_IMAGE_U8 );
  vx_graph graph = vxCreateGraph(context);
  thout = vxCreateVirtualImage( graph, Width, Lines, VX_DF_IMAGE_U8 );
  sub0  = vxCreateVirtualImage( graph, Width, Lines, VX_DF_IMAGE_U8 );
  add0  = vxCreateVirtualImage( graph, Width, Lines, VX_DF_IMAGE_U8 );    ⎫
  ...(SNIP)...                                                            ⎬ DEFINITION OF GRAPH STRUCTURE
  vxThresholdNode(graph, in, thres, thout);                               ⎪
  vxSubtractNode(graph, thout, in, sub0);                                 ⎪
  vxAddNode(graph, thout, in, add0);                                      ⎪
  vxAddNode(graph, sub0, add0, out);                                      ⎭
  ...(SNIP)...                                                            ⎫
  vxVerifyGraph(graph);                                                   ⎬ ANALYZE GRAPH STRUCTURE AND
  vxProcessGraph(graph);                                                  ⎭ EXECUTE PROCESSING EXPRESSED BY GRAPH
  ...(SNIP)...
  vxReleaseGraph(&graph);
  vxReleaseContext(&context);
}
```

Fig. 12

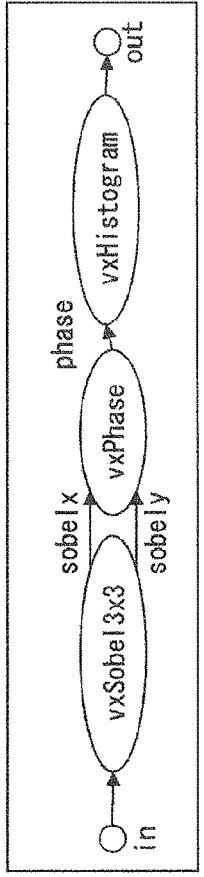

```
void func() {
vx_context context = vxCreateContext();
vx_image in    = vxCreateImage(context, width, height, VX_DF_IMAGE_U8);
vx_image out   = vxCreateImage(context, width, height, VX_DF_IMAGE_U8);
vx_graph graph = vxCreateGraph(context);
sobelx = vxCreateVirtualImage( graph, Width, Lines, VX_DF_IMAGE_S16 );  ⎫
sobely = vxCreateVirtualImage( graph, Width, Lines, VX_DF_IMAGE_S16 );  ⎬ DEFINITION OF GRAPH STRUCTURE
phase  = vxCreateVirtualImage( graph, Width, Lines, VX_DF_IMAGE_U8  );  ⎭

...(SNIP)...
vxSobel3x3Node(graph, in, sobelx, sobely);         ⎫
vxPhaseNode(graph, sobelx, sobely, phase);         ⎬
vxHistogramNode(graph, phase, out);                ⎭
...(SNIP)...                                        ⎫ ANALYZE GRAPH STRUCTURE AND
vxVerifyGraph(graph);                               ⎬ EXECUTE PROCESSING EXPRESSED BY GRAPH
vxProcessGraph(graph);                              ⎭
...(SNIP)...
vxReleaseGraph(&graph);
vxReleaseContext(&context);
}
```

```
resA = A();
B(resA);
C(resA);
```

```
resA = A();
C(resA);
B(resA);
```

Fig. 13

COMPUTING CONTROL DEVICE, COMPUTING CONTROL METHOD, AND COMPUTER READABLE MEDIUM

CROSS-REFERENCE TO RELATED APPLICATIONS

This application is based upon and claims the benefit of priority from Japanese patent application No. 2015-063957, filed on Mar. 26, 2015, the disclosure of which is incorporated herein in its entirety by reference.

BACKGROUND

The present invention relates to a computing control device, a computing control method, and a computer readable medium.

The international standards of an Application Programming Interface (API) for image recognition, which is currently under preparation by The Khronos Group (hereinafter it will be referred to as "Khronos"), include OpenVX. In OpenVX, a graph manager operating on a computing control device, which is a target device, interprets a user application described in a graph form and performs efficient processing using an operator (accelerator) of the computing control device (Khronos Group,"OpenVX", [online], [searched on Mar. 26, 2015], Internet <see URL: https://www.khronos.org/openvx/>).

FIG. 11 is a diagram showing an example of an OpenVX code and a graph created from this code. The graph is shown in the frameon the upper right side of FIG. 11.

In the OpenVX code, first, a graph structure is defined by a vx**Node( ) function group (e.g., processing function xvThresholdNode (graph, in, thres, thout) etc.). Further, the graph structure is analyzed by a vxVerifyGraph( ) function to determine parallelism of processing and the order of the processing expressed in the graph. The processing related to the graph is then executed by a vxProcessGraph( ) function.

In the graph shown in FIG. 11, binarization processing is performed on an input image "in" at the vxThreshold node, subtraction and addition are performed at the vxSubtract node and the first vxAdd node, respectively, and the results of the operations are added at the second vxAdd node. While the vxThreshold node needs to be processed first in this example, either one of the vxSubtract node and the first vxAdd node may be processed first or they may be processed in parallel.

The term "graph" here is a directed graph (Directed Acyclic Graph).

In nodes (Base Nodes) used on the graph, in order to maintain the compatibility in the OpenVX code, the specifications of the node such as their required accuracy or behavior is strictly defined by Khronos. For example, a vxPhase node that calculates an edge direction for each pixel is defined to output with the accuracy of 8 bits from 0 to 255. If the edge directions to be calculated are about eight or nine directions, processing with a relatively light load such as If-Then-Else with the accuracy of about 3 or 4 bits (about 20 cycles) is generally sufficient. However, processing such as arctan in which the computation amount is large (about 1150 cycles) is required for processing with the accuracy of 8 bits defined by Khronos, which increases the process time.

FIG. 12 is a diagram showing another example of the OpenVX code and a graph created from this code. In FIG. 12 as well, the graph is shown in the frame on the upper right side of FIG. 12.

In this example, the vxPhase node calculates the edge direction by inputting outputs sobelx and sobely of a vxSobel3x3 node that calculates edge components in the X direction and the Y direction. Then a vxHistogram node is called by inputting the edge direction phase that has been calculated.

For example, in the histogram calculation processing (vxHistogram node) of a Histogram Of Gradient (HOG) application, which is one image recognition application, the accuracy of 3 or 4 bits with about 8 or 9 directions is generally sufficient.

Therefore, when a user connects the vxHistogram node as the node subsequent to the vxPhase node to implement the HOG application, while the accuracy of about 3 bits is sufficient in the vxHistogram node, the operation of the accuracy of 8 bits is performed in the vxPhase node. Therefore, compared to the case in which the edge direction calculation node with the accuracy of 3 bits is used, process time several times longer is required to obtain the same processing results.

Further, in the typical C language or C++ language, it is difficult to express the parallelism of processing. For example, when there are functions B and C that use the output of a function A, it is possible to process the functions B and C in parallel unless there is a dependence relationship between the functions B and C. However, when the program is sequentially described in the typical C language, this parallelism does not explicitly appear.

Figure 13:
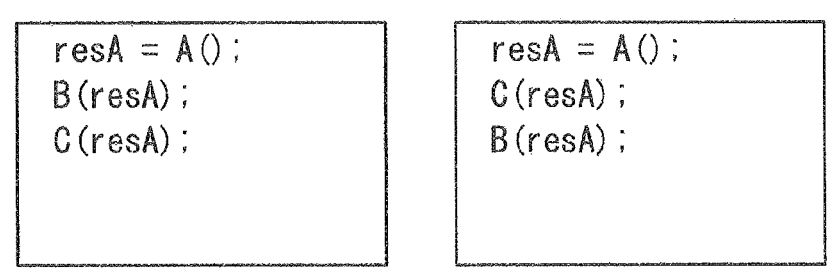

FIG. 13 is a diagram showing an example of the program described in the C language.

For example, when the program is written as shown in the left side of FIG. 13, the function C is executed after the function B is executed and when the program is written as shown in the right side of FIG. 13, the function B is executed after the function C is executed. That is, whether the function B and the function C can be executed in parallel is not expressed.

Therefore, in a multi-core processor including a plurality of computing resources, a user needs to explicitly describe a fork or a join of the function. However, since the allocation of the optimal function may vary for each target device, it is difficult to describe the program optimal for all the devices while keeping the code compatibility.

In the OpenVX, the graph structure is defined on the C language program and the graph manager included in a device in compliance with OpenVX is able to interpret the above program, analyze the graph structure defined on the program, and extract the parallelism. Therefore, even when the OpenVX code is described by the user without knowing the details of the target device, the optimal function can be allocated to the target device via the graph manager.

SUMMARY

However, in the OpenVX code shown in FIG. 12, the graph manager according to related art uses the function described by the user, which sometimes leads to the increase of the process time.

The cause of the degradation in the performance is, as described above, that the user specifies, for the preceding processing, processing which is strictly defined as having a high accuracy even though the accuracy that is required in the subsequent processing is low Since it is assumed in OpenVX to use the nodes that have been prepared in advance, even when processing is being performed using a processing function having an accuracy higher than necessary, it maybe possible that the user does not notice that the processing is being performed using a processing function having an accuracy higher than necessary. Therefore, degradation in the performance that is not intended by the user occurs.

It has been therefore demanded to provide a computing control device, a computing control method, and a non-transitory computer readable medium that records a computing control program capable of avoiding unnecessary calculations and performing efficient processing without causing a user to consider the processing accuracy to improve the performance.

The other problems of the prior art and the novel characteristics of the present invention will be made apparent from the descriptions of the specification and the accompanying drawings.

According to one embodiment, a computing control device analyzes a connection relationship between nodes in a graph, calculates a processing accuracy of a preceding node according to a required accuracy of a subsequent node, and when derived nodes having processing accuracies different from one another are registered in the preceding node, replaces them by nodes having a sufficient processing accuracy to execute processing related to the graph.

A method or a system used in place of the apparatus according to the above embodiments, a program that causes a computer to execute some or all of the processing of this apparatus, an imaging apparatus including this apparatus and the like are effective as aspects of the present invention.

According to the embodiment stated above, it is possible to provide a computing control device, a computing control method, and a non-transitory computer readable medium that records a computing control program capable of avoiding unnecessary calculations and performing efficient processing without causing a user to consider the processing accuracy to improve the performance.

BRIEF DESCRIPTION OF THE DRAWINGS

The above and other aspects, advantages and features will be more apparent from the following description of certain embodiments taken in conjunction with the accompanying drawings, in which:

FIG. 3 is a diagram showing an estimated graph and node information according to the first embodiment;

FIG. 4 is a diagram showing kernel information according to the first embodiment;

FIG. 5 is a diagram showing processing function information according to the first embodiment;

FIG. 11 is a diagram showing an example of an OpenVX code and a graph created from this code;

FIG. 12 is a diagram showing another example of the OpenVX code and a graph created from this code; and FIG. 13 is a diagram showing an example of a program described in a C language.

DETAILED DESCRIPTION

Figure 1:
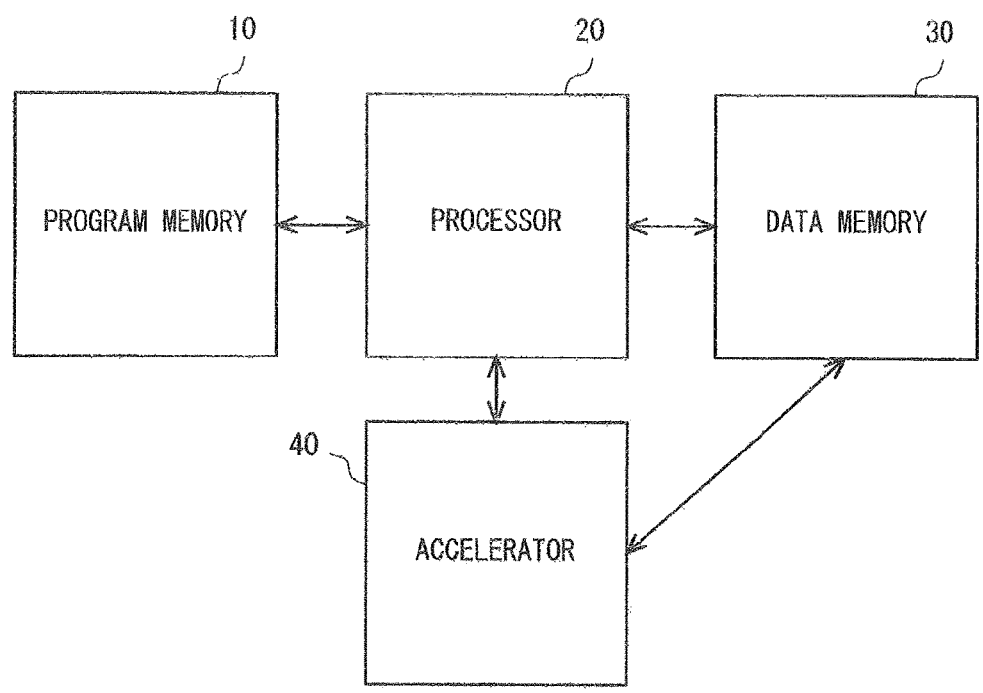
FIG. 1 is a block diagram showing a schematic configuration of a computing control device 1 according to a first embodiment.

For the clarification of the description, the following description and the drawings may be omitted or simplified as appropriate. Further, each element shown in the drawings as functional blocks that perform various processing can be formed of a CPU, a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

Further, the above program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Further, the program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

(First Embodiment)

A computing control device according to the first embodiment is an OpenVX device. This device analyzes a connection relationship between nodes in a graph, calculates a processing accuracy of a preceding node according to a required accuracy of a subsequent node, and when derived nodes having processing accuracies different from one another are registered in the preceding node, replaces them by nodes having a sufficient processing accuracy to execute processing related to the graph.

First, a configuration of a computing control device 1 according to the first embodiment will be described.

FIG. 1 is a block diagram showing a schematic configuration of the computing control device 1 according to the first embodiment.

The computing control device 1 includes a program memory 10, a processor 20, a data memory 30, an accelerator 40 and the like.

The program memory 10 stores an application program starting from a main function and a graph manager program. The application program is obtained by compiling an OpenVX code described by a programmer shown in FIG. 11 or 12 by a compiler and changing the form of the code to an executable form (e.g., exe form).

The processor 20 reads out the graph manager program from the program memory 10, executes the graph manager program, and operates the graph manager program as a graph manager of the OpenVX device. Further, the processor 20 as a graph manager analyzes the graph structure of the application program read out from the program memory 10 and executes the operation of the application program.

The data memory 30 stores the graph structure analyzed by the processor 20. Further, the data memory 30 stores kernel information, processing function information and the like that will be described later.

The accelerator 40 executes the graph that has been analyzed and configured by the processor 20.

Next, an operation, that is, a computing control method, of the computing control device 1 according to the first embodiment will be described.

Figure 2:
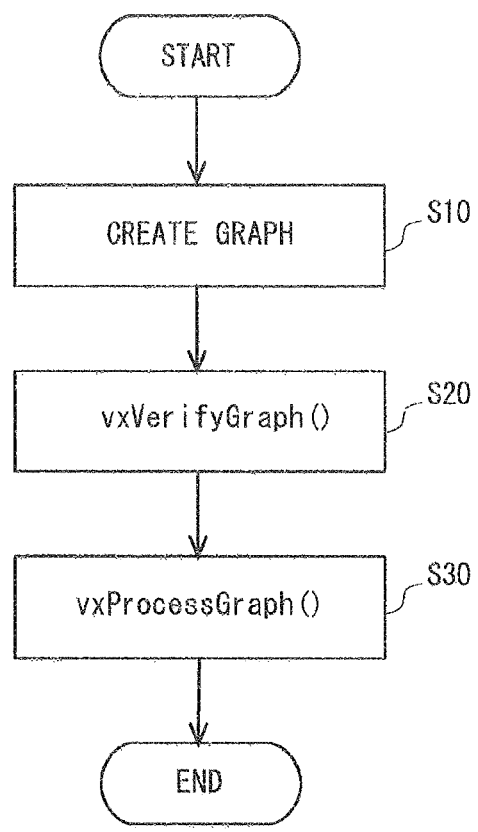
FIG. 2 is a flowchart showing a procedure for processing an application program operated on the computing control device 1 according to the first embodiment.

FIG. 2 is a flowchart showing a procedure for processing the application program operated on the computing control device 1 according to the first embodiment.

In the application program, first, a graph is created by the definition of the graph structure (Step S10). That is, necessary nodes are generated and a connection relationship between them is set.

FIG. 3 is a diagram showing an estimated graph and graph information according to the first embodiment. The graph information is created by the processor 20 as the graph manager by referring to kernel information, processing function information and the like that will be described later when the processor 20 executes the graph manager program and the application program.

The frame on the upper left side of FIG. 3 shows a graph estimated in the application program according to the first embodiment. In this graph, there are three nodes besides an input terminal "in" and an output terminal "out". The graph information includes the information for the three nodes of an ID for identifying the node in the graph, the kernel name indicating the processing contents, a processing function corresponding to the kernel, and information on an input/output argument. In the graph information shown in FIG. 3, the information on the input/output argument is expressed by the node ID and the argument number. For example, in a vxSobel3x3 node whose node ID is 1, the second argument, which is the output argument, is connected to the first argument of a vxPhase node whose node ID is 2. Further, in a vxHistogram node whose node ID is 3, the first argument, which is the input argument, is connected to the third argument of the vxPhase node whose node ID is 2.

FIG. 4 is a diagram showing the kernel information according to the first embodiment. The kernel information is stored in the data memory 30 in advance by a user such as a semiconductor vendor.

In the kernel information, one or more processing functions that achieve the kernel are registered for each kernel. For example, a processing function vxPhaseKernel( ) and a processing function vxPhaseKernelFast( ) are registered in a vxPhase kernel.

FIG. 5 is a diagram showing the processing function information according to the first embodiment. The processing function information is also stored in the data memory 30 in advance by the user.

In the processing function information, the argument name, the input/output direction, and the accuracy for each argument are registered for each processing function. For example, in the processing function vxPhaseKernel( ), the third argument has the name of "out", is an output argument, and has an accuracy of 8 bits. Further, in the processing function vxPhaseKernelFast( ), the third argument has the name of "out", is an output argument, and has an accuracy of 3 bits.

In the application program, when a plurality of processing functions corresponding to the kernel are registered, the processing function that has been registered first is used as a default processing function when the graph is created in Step S10. For example, for the vxPhase node whose node ID is 2 of the graph information shown in FIG. 3, two processing functions corresponding to the vxPhase kernel have been registered as shown in the processing function information shown in FIG. 4 and the processing function vxPhaseKernel( ) that has been registered first is used as a default processing function.

Next, in the application program, a processing function vxVerifyGraph( ) shown in FIG. 2, that is, analysis of the graph structure, is executed (Step S20).

Figure 6:
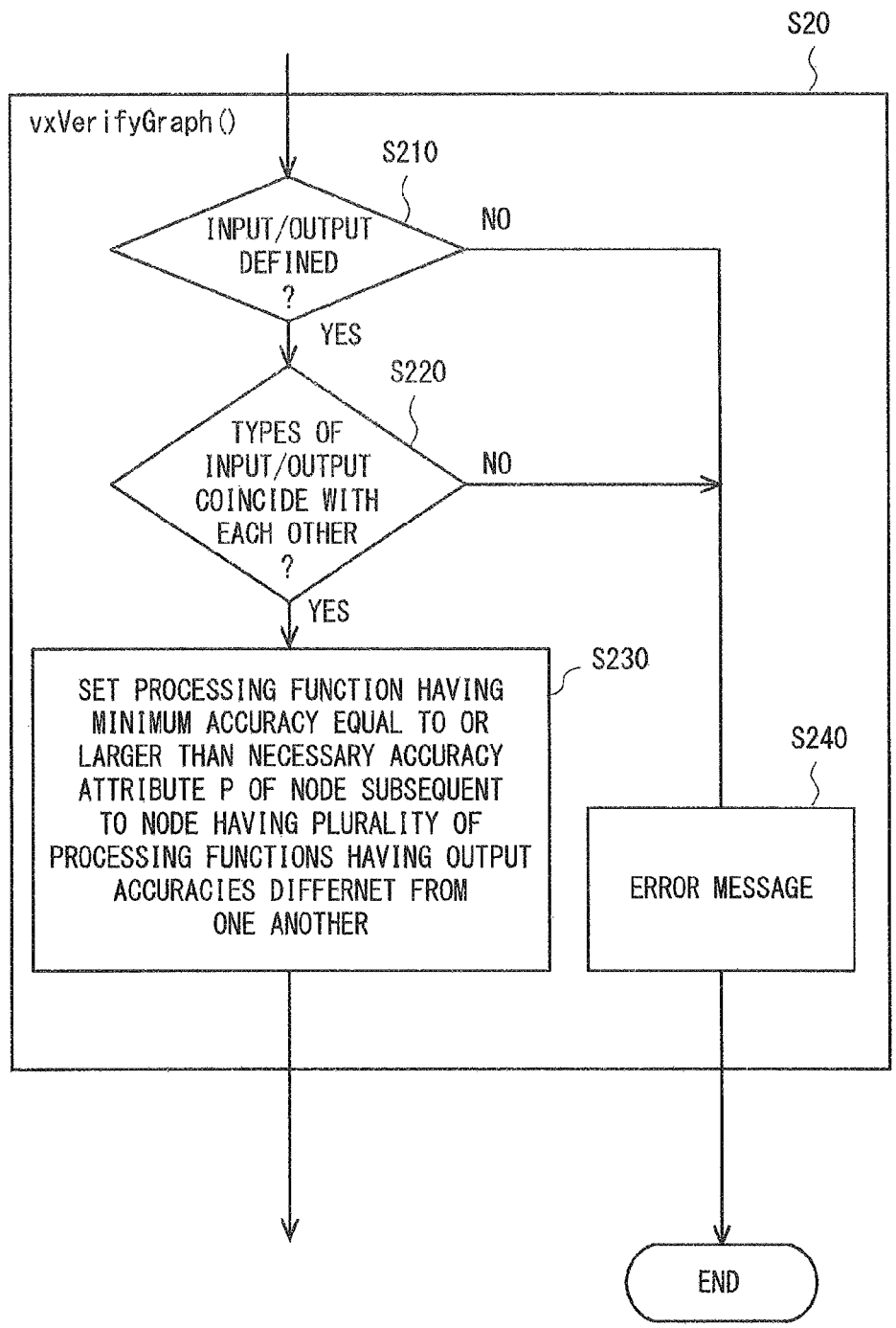
FIG. 6 is a flowchart showing a detailed processing procedure of a processing function vxVerifyGraph( ) according to the first embodiment.

FIG. 6 is a flowchart showing a detailed processing procedure of the processing function vxVerifyGraph( ) according to the first embodiment. The processing function vxVerifyGraph( ) in Step S20 includes Steps S210 to S230 (note that this flowchart does not indicate that Steps S210 to S230 come after Step S20).

In the processing function xvVerifyGraph( ), first, it is checked whether the input and the output are defined for all the nodes in the graph (Step S210). If there is a node that has not been defined (No in Step S210), an error message is output (Step S240) and arbitrary processing is carried out (e.g., the processing ends).

Next, the nodes in the graph are tracked from the starting node in order to check whether the types of the input and the output coincide with each other (Step S220). When there are nodes in which the types of the input and the output do not coincide with each other (No in Step S220), the error message is also output (Step S240) and arbitrary processing is carried out (e.g., the processing ends).

Next, a node having a plurality of processing functions having accuracies different from one another is searched for from among all the nodes in the graph and a required accuracy attribute P of the node subsequent to this node is checked. From the plurality of processing functions that this node has, a processing function having the minimum accuracy equal to or larger than the required accuracy attribute P is selected and the selected processing function is set as the processing function of the node (Step S230).

Now, Step S230 will be specifically described.

First, for each node of the graph shown in FIG. 3, a node having a plurality of processing functions having output accuracies different from one another is searched. It will be understood, from the kernel information shown in FIG. 4, that the vxPhase node whose node ID is 2 has the processing function vxPhaseKernel( ) and the processing function vxPhaseKernelFast( ).

Next, an input accuracy necessary for the vxHistogram node subsequent to the vxPhase node is searched. It will be understood, from the processing function information shown in FIG. 5, that the accuracy of an input argument "dir" of the processing function vxHistogramKernel( ) is 3 bits.

Next, from the processing function vxPhaseKernel( ) and the processing function vxPhaseKernelFast( ) held by the vxPhase node, a processing function having the minimum output accuracy equal to or larger than 3 bits, that is, the processing function vxPhaseKernelFast( ) in which the accuracy of the output argument out is 3 bits, is selected, and the selected function is set as a processing function of the vxPhase node. Accordingly, the processing function of the vxPhase node is changed from the processing function vxPhaseKernel( ) to the processing function vxPhaseKernelFast( ), which leads to the higher efficiency of the operation.

In Step S230, when the processing function configured by default of the node having a plurality of processing functions having accuracies different from one another is the processing function having the minimum accuracy equal to or larger than the required accuracy attribute P, the processing function is not replaced as a matter of cource.

Further, an accuracy other than the input accuracy of the subsequent node may be used as the required accuracy of the subsequent node and an accuracy other than the output accuracy of the preceding node may be used as the accuracy of the preceding node which is compared to the required accuracy of the subsequent node.

In the application program, at the last stage, the processing function xvProcessGraph( )shown in FIG. 2, that is, processing expressed by the graph, is executed (Step S30).

Figure 7:
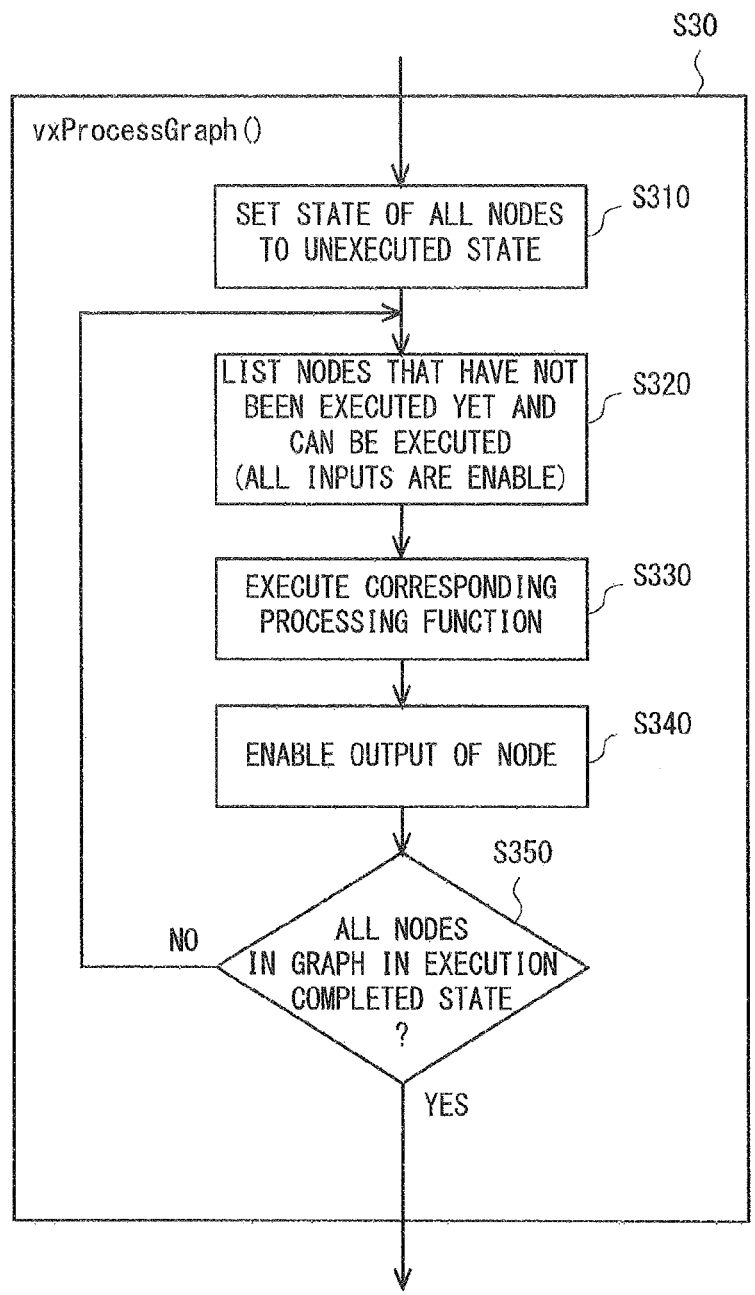
FIG. 7 is a flowchart showing a detailed processing procedure of a processing function vxProcessGraph( ) according to the first embodiment.

FIG. 7 is a flowchart showing a detailed processing procedure of a processing function vxProcessGraph( ) according to the first embodiment. The processing function vxProcessGraph( ) in Step S30 includes Steps S310 to S350.

First, the state of all the nodes of the graph in which the processing functions of some nodes have been replaced in Step S230 is set to an unexecuted state (Step S310).

Then the nodes that are in the unexecuted state and can be executed (all the nodes connected to the input argument have completed the execution) in the graph are listed (Step S320). At this time, it is assumed that the processing has already been completed in the input terminal "in".

Then the processing functions corresponding to the listed nodes are executed in the order listed (Step S330). As described above, the operation of the application program is basically performed by the processor 20. However, the processing function in Step S330 may be executed by the processor 20 or by the accelerator 40 in response to an instruction sent to the accelerator 40 from the processor 20.

Then the output of the node that has executed the processing function in Step S330 is enabled and the state of this node is set to an execution completed state (Step S340).

Last, it is determined whether all the nodes in the graph have completed the execution (Step S350). When there are some nodes that have not completed the execution (No in Step S350), the processing goes back to Step S320 and when all the nodes have completed the execution (Yes in Step S350), the processing function vxProcessGraph( ) is ended.

As stated above, in the computing control device or the computing control method according to the first embodiment, it is possible to suppress the execution of the function that achieves an accuracy higher than necessary and to reduce the execution time.

In the computing control method according to the first embodiment, a case in which the accuracy of the preceding node is increased may also occur in addition to the case in which the accuracy of the preceding node is decreased as stated above.

As described above, the computing control device according to the first embodiment extracts a node having a plurality of processing functions having accuracies different from one another from a graph; calculates a required accuracy of a node subsequent to the node that has been extracted; selects a processing function having a minimum accuracy equal to or higher than the required accuracy that has been calculated from among the plurality of processing functions included in the node that has been extracted; and sets the processing function that has been selected as the processing function of the node that has been extracted.

(Second Embodiment)

A computing control device according to a second embodiment selects a processing function to be replaced from among a plurality of processing functions using the number of types of the values processed by the subsequent node, that is, the number of values that the information received by the subsequent node may have instead of using the effective bit width (the width of the bit that can be used as information) as the required accuracy attribute P of the node subsequent to the node having a plurality of processing functions having accuracies different from one another.

A schematic configuration of the computing control device according to the second embodiment is similar to that of the computing control device according to the first embodiment and thus the illustration and the description thereof will be omitted.

Figure 8:
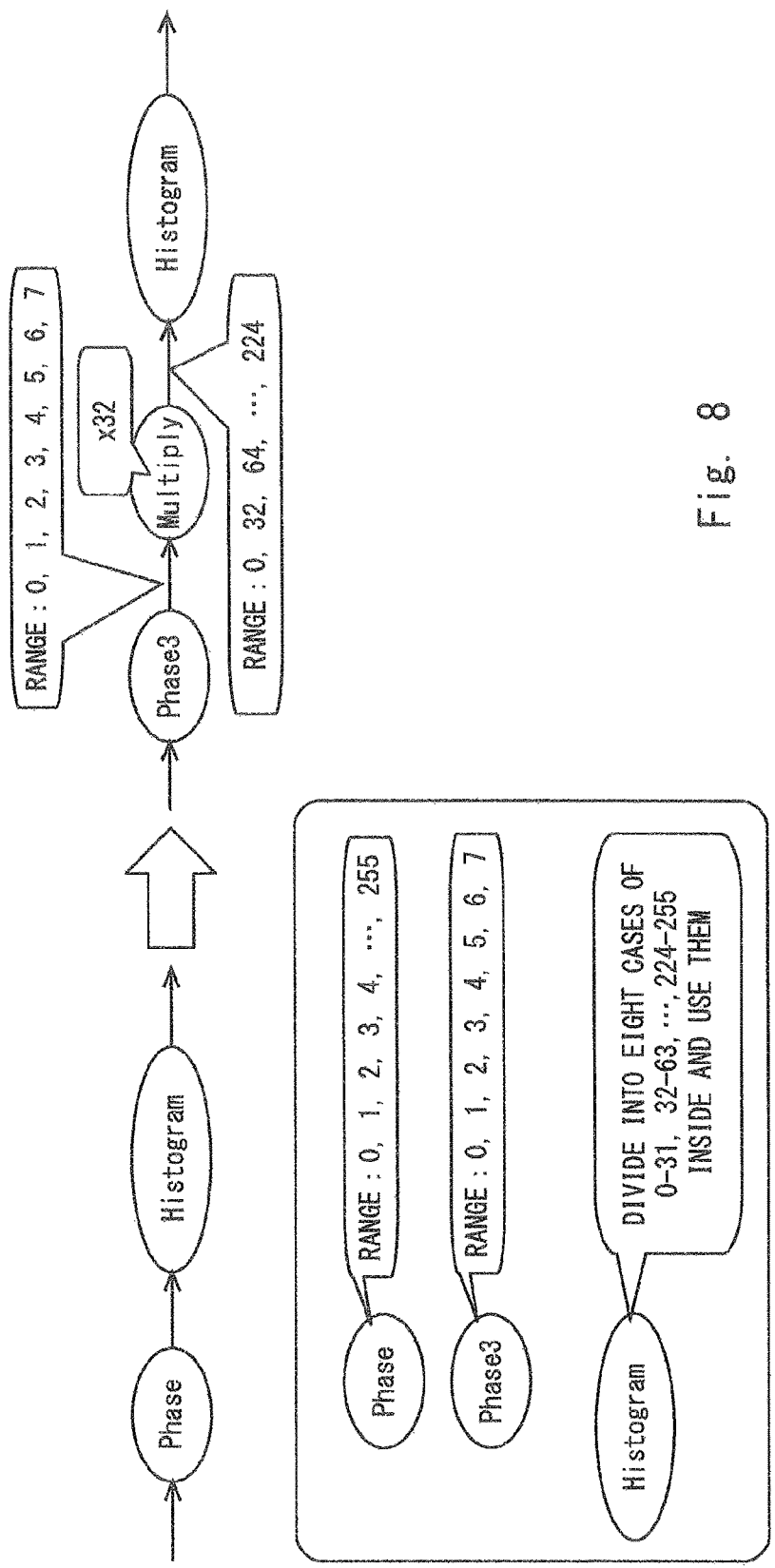
FIG. 8 is a diagram for describing an outline of a computing control method according to a second embodiment.

FIG. 8 is a diagram for describing an outline of the computing control method according to the second embodiment.

In the target graph, the vxPhase node and the vxHistogram node are successive. In the vxPhase node, the processing function vxPhaseKernel( ) having the accuracy of 8 bits in the range from 0 to 255 is set. Further, the processing function xvHistogramKernel( ) having the accuracy of 3 bits that uses the range that has been divided into eight types of values : 0-31, 32-63, . . . , 224-255, that is, the function that uses only the eight types of values, is set in the vxHistogram node. That is, the vxPhase node uses the processing function having the accuracy higher than necessary with respect to the subsequent vxHistogram node. Further, the vxPhase node has, besides the processing function vxPhaseKernel( ), a processing function vxPhase3Kernel( ) having the accuracy of 3 bits in the range from 0 to 7.

At this time, in the computing control method according to the second embodiment, the processing function vxPhaseKernel( ) of the vxPhase node is replaced by the processing function vxPhase3Kernel( ), a vxMultiply node that scales the output of the processing function vxPhase3Kernel ( ) by a factor of 32 is inserted, the range is changed to 0-255, and the vxMultiply node is connected to the subsequent vxHistogram node.

As described above, in the computing control device or the computing control method according to the second embodiment, it is possible to increase the number of cases in which the performance can be improved by using the accuracy other than the effective bit width.

As described above, the computing control device according to the second embodiment calculates the required accuracy of the subsequent node based on the number of values that the information received by the subsequent node may have.

Further, the computing control device according to the second embodiment adds the node that scales the output of the node having a plurality of processing functions between the node having the plurality of processing functions and the subsequent node.

(Third Embodiment)

A computing control device according to a third embodiment selects a processing function to be set to the preceding node from among the plurality of processing functions having accuracies different from one another according to a subsequent node having the highest required accuracy attribute P among the plurality of subsequent nodes when there are a plurality of subsequent nodes with respect to a node having a plurality of processing functions having accuracies different from one another.

Since the schematic configuration of the computing control device according to the third embodiment is similar to the computing control device according to the first embodiment, the illustration and the description thereof will be omitted.

Figure 9:
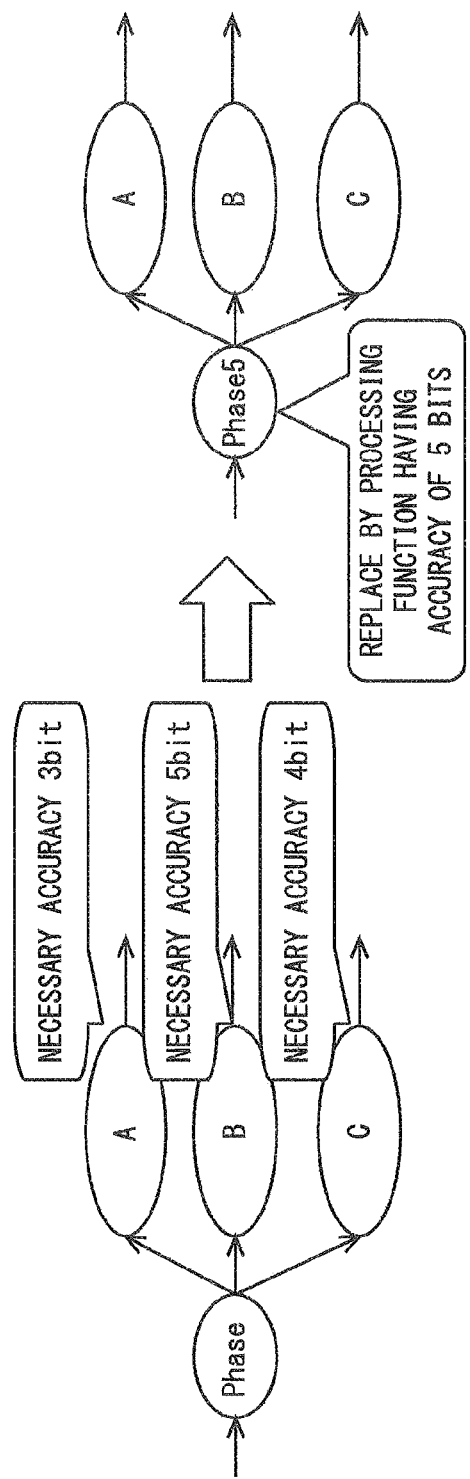
FIG. 9 is a diagram for describing an outline of a computing control method according to a third embodiment.

FIG. 9 is a diagram for describing the outline of a computing control method according to the third embodiment.

In the target graph, a vxA node, a vxB node, and a vxC node follow in parallel the vxPhase node. The required accuracies of the vxA node, the vxB node, and the vxC node are 3 bits, 5 bits, and 4 bits, respectively. That is, among the successive three nodes, the vxB node has 5 bits, which is the highest required accuracy.

At this time, in the computing control method according to the third embodiment, the processing function of the vxPhase node is replaced by a processing function vxPhase5Kernel( ) having the accuracy of 5 bits.

In this way, in the computing control device or the computing control method according to the third embodiment, it is possible to increase the number of cases in which the performance can be improved by using a more appropriate accuracy as the preceding node.

Note that the computing control device or the computing control method according to the third embodiment may be applied not only to the case in which a plurality of subsequent nodes are arranged in parallel after the preceding node as described above but also to a case in which the plurality of subsequent nodes are arranged in series after the preceding node.

As described above, the computing control device according to the third embodiment uses, when there are a plurality of subsequent nodes with respect to the node having a plurality of processing functions, a maximum required accuracy of the required accuracies of the plurality of subsequent nodes as the required accuracy when the processing function is selected.

(Fourth Embodiment)

A computing control device according to a fourth embodiment analyzes processing contents of each node and acquires required accuracy information when a compiler compiles the OpenVX code.

Since the schematic configuration of the computing control device according to the fourth embodiment is similar to that of the computing control device according to the first embodiment, the illustration and the description thereof will be omitted.

Figure 10:
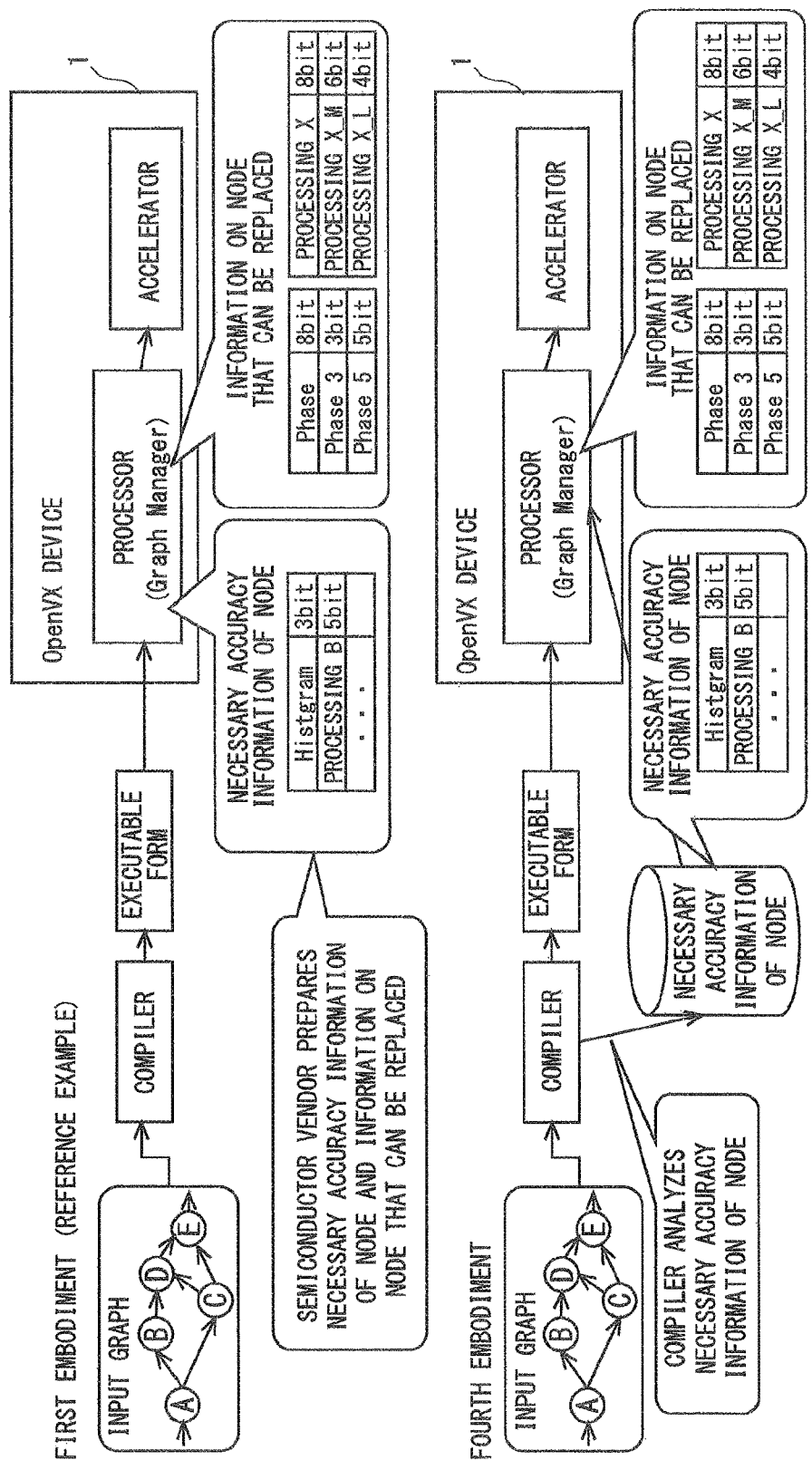
FIG. 10 is a diagram for describing an outline of a computing control method according to a fourth embodiment.

FIG. 10 is a diagram for describing an outline of a computing control method according to the fourth embodiment. For the sake of clarification of the description, the computing control method according to the first embodiment as a reference example and the computing control method according to the fourth embodiment are arranged in the vertical direction.

In the computing control method according to the first embodiment, the semiconductor vendor prepares in advance the required accuracy information of each node and information on a node that can be replaced and stores them in a data memory (not shown) of the computing control device (OpenVX device) 1.

On the other hand, in the computing control method according to the fourth embodiment, when the compiler compiles the OpenVX code to create a program in the executable form (e.g., "exe" form), the compiler analyzes processing contents of each node, acquires required accuracy information such as the effective bit width, and stores the required accuracy information in the data memory (not shown) of the computing control device 1. Accordingly, the semiconductor vendor can prepare in advance only the node information that can be replaced and store it in the data memory of the computing control device 1.

In this way, in the computing control device or the computing control method according to the fourth embodiment, it is possible to improve the performance even when the user does not register the accuracies of the nodes in advance.

As described above, the computing control device according to the fourth embodiment uses the required accuracy of the node acquired by the compiler as the required accuracy of the subsequent node when the compiler has complied the code information.

While the present invention made by the present inventors has been described with reference to the exemplary embodiments, it is needless to say that the present invention is not limited to the above exemplary embodiments and can be changed in various ways within the scope of the present invention.

The first to fourth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A computing control device comprising:
   extracting a node having a plurality of processing functions different from one another from a graph, each of the plurality of processing functions having an accuracy;
   calculating a required accuracy of a node subsequent to the node that has been extracted;
   selecting a processing function having a minimum accuracy equal to or higher than the required accuracy that has been calculated from among the plurality of processing functions included in the node that has been extracted; and
   setting the processing function that has been selected as the processing function of the node that has been extracted.

2. The computing control device according to claim 1, comprising calculating the required accuracy of the subsequent node based on a number of values that information received by the subsequent node may have.

3. The computing control device according to claim 2, comprising adding a node that scales an output of the node that has been extracted between the node that has been extracted and the subsequent node.

4. The computing control device according to claim 1, wherein when there are a plurality of subsequent nodes with respect to the node that has been extracted, a maximum required accuracy of the required accuracies of the plurality of subsequent nodes is used as the required accuracy when the processing function is selected.

5. The computing control device according to claim 1, wherein a required accuracy of a node acquired when a compiler has compiled code information is used as the required accuracy of the subsequent node.

6. A computing control device comprising:
a program memory that stores a graph manager program and an image processing program;
a processor that executes the graph manager program and the image processing program and analyzes and executes a graph related to the image processing program; and
a data memory that stores the graph that has been analyzed,
wherein the processor performs, for the graph stored in the data memory, the following processing of:
extracting a node having a plurality of processing functions different from one another, each of the plurality of processing functions having an accuracy;
calculating a required accuracy of a node subsequent to the node that has been extracted;
selecting a processing function having a minimum accuracy equal to or higher than the required accuracy that has been calculated from among the plurality of processing functions included in the node that has been extracted; and
setting the processing function that has been selected as the processing function of the node that has been extracted.

7. A computing control method in which a computer executes the following processing of:
extracting a node having a plurality of processing functions different from one another from a graph, each of the plurality of processing functions having an accuracy;
calculating a required accuracy of a node subsequent to the node that has been extracted;
selecting a processing function having a minimum accuracy equal to or higher than the required accuracy that has been calculated from among the plurality of processing functions included in the node that has been extracted; and
setting the processing function that has been selected as the processing function of the node that has been extracted.

8. A non-transitory computer readable medium that stores a computing control program for causing a computer to execute the steps of the computing control method according to claim 7.

* * * * *